United States Patent
Kim

(10) Patent No.: US 6,286,633 B1
(45) Date of Patent: Sep. 11, 2001

(54) PARKING BRAKE FOR AN AUTOMATIC TRANSMISSION MECHANISM

(75) Inventor: Woo-Yeol Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/413,031

(22) Filed: Oct. 6, 1999

(30) Foreign Application Priority Data

May 13, 1999 (KR) .................................................. 99-17140

(51) Int. Cl.[7] ....................................................... B62C 7/02
(52) U.S. Cl. ........................... 188/69; 188/31; 192/220.2; 74/473 R
(58) Field of Search ......................... 188/69, 105, 106 R, 188/31, 70 R; 74/471 XY, 471 R, 473 R, 483 R; 192/219, 219.3, 219.4, 220.2, 220.3

(56) References Cited

U.S. PATENT DOCUMENTS

| | | | |
|---|---|---|---|
| 3,822,768 | * | 7/1974 | Sebulke ............................... 188/70 R |
| 4,907,681 | * | 3/1990 | Kuusik et al. ...................... 188/31 X |
| 5,704,457 | * | 1/1998 | Kimura et al. ....................... 192/4 A |
| 5,954,179 | * | 9/1999 | Osborn ............................... 192/219.5 |

* cited by examiner

Primary Examiner—Robert J. Oberleitner
Assistant Examiner—Pamela J. Rodriguez
(74) Attorney, Agent, or Firm—Birch, Stewart, Kolasch & Birch, LLP

(57) ABSTRACT

A parking brake for the automatic transmission mechanism of a vehicle so constructed as to affect no adverse influence on the operation of the automatic transmission mechanism even though a change lever is positioned in a parking range while the vehicle is running. The parking brake includes a first roller fixedly disposed to cooperatively rotate with an output shaft; a second roller coaxially movable with the first roller but disposed not to rotate; a restricting unit disposed at a facing surface between the first roller and the second roller to restrict the rotation of the first roller when the first and second rollers are in close adherence; and a driving unit for slidingly moving the second roller according to the selection or non-selection of the change lever to the parking position to couple and detach the first and second rollers.

8 Claims, 5 Drawing Sheets

PARKING BRAKE FOR AN AUTOMATIC TRANSMISSION MECHANISM

BACKGROUND OF THE INVENTION

1. Field of the Invention

The present invention relates to a parking brake and more particularly to a parking brake for an automatic transmission mechanism.

2. Description of the Prior Art

Generally, a vehicle mounted with an automatic transmission mechanism is established with a transmission range covering parking (P), reverse driving (R), neutral (N), driving (D) and the like.

When a change lever at the transmission range is positioned at a parking range, an output axle is mechanically restricted to allow a vehicle to maintain a parking state, but in order to maintain the parking state a separate parking mechanism is needed.

As illustrated in FIGS. 4 and 5, the separate parking mechanism includes a change lever assembly 51 where a change lever 50 is so disposed as to be movable to each range, a manual lever 54 protrusively disposed at a transmission case 52 and internally connected by a detent plate 53, a control cable 55 connecting the change lever assembly 51 and the manual lever 54, a parking rod 56 connected at one end thereof to the detent plate 53 for slideable movement, a parking lever 58 connected at one end thereof to the parking rod 56 for rotation by way of a hinge shaft 57 and a parking gear 60 intermittently restricted by the parking lever 58 and so mounted as to be cooperatively connected to an output shaft 59.

Furthermore, the parking lever 58 is provided with a spring 61 which is supported at one end thereof by a fixed portion and is connected thereto at the other end thereof, such that the parking lever 58 is always detached from the parking gear 60 to apply resilience thereto.

In other words, the parking lever 58 is rotatably moved to intermittently restrict the parking gear 60, and when the parking gear 60 is restrained, the output shaft 59 is put to a restricted state to allow a vehicle to maintain the parking.

Now, operation of the parking brake mechanism thus described will be explained.

When a driver shifts the changer lever 50 to a parking (P) position to park a vehicle, the control cable 55 rotates the manual lever 54 and simultaneously rotates the detent plate 53 connected thereto. When the detent plate 53 is rotated, the parking rod eccentrically connected thereto is moved to the right direction on the FIG. 4.

When the parking rod 56 is moved to the right side, the parking lever 58 adhered to a tip end of the parking rod 56 is rotated clockwise about the hinge shaft 57, where a tip end of the parking lever 58 is inserted into gear grooves of the parking gear 60. When the parking lever 58 is inserted into the gear grooves of the parking gear 60 to thereby prevent the parking gear 60 from rotating, the output shaft 59 where the parking gear 60 is fixedly disposed is refrained from rotating, thereby causing the vehicle to maintain the parking state.

SUMMARY OF THE INVENTION

However, there is a problem in that, when the control cable activates the parking rod and the parking lever according to movement of the change lever as described above, heavy impact is generated on the parking lever and the parking gear when the change lever is shifted to the parking range by a driver during change lever manipulation while the vehicle is running, and still worse, the automatic transmission mechanism can be damaged to make the vehicle inoperable.

Furthermore, an operating direction of the parking lever is on a straight line relative to a rotating direction of the parking gear, such that, when the parking gear is rotated by a relatively strong force such as sudden start (due to erroneous operation of the automatic transmission mechanism) and the like, the parking lever resiliently supported by a spring is detached from the gear grooves of the parking gear to thereby cause an accident to occur.

The present invention is disclosed to solve the aforementioned problem and it is an object of the present invention to provide a parking brake for automatic transmission mechanism configured not to affect the operation of the automatic transmission mechanism even though the change lever is positioned at a parking range while the vehicle is running, thereby preventing noise and damage.

Furthermore, the output shaft is firmly secured even when a vehicle mounted with an automatic transmission mechanism is started suddenly, such that a braking force is increased while the vehicle is parked to thereby maintain a parking state of the vehicle.

In accordance with the object of the present invention, there is provided a parking brake for automatic transmission mechanism, the brake adapted to restrict an output shaft according to a change lever at the automatic transmission mechanism being selectively positioned at a parking range to thereby generate a braking force while a vehicle is parked, wherein the brake comprises:

a first roller fixedly disposed to cooperatively rotate with the output shaft;

a second roller coaxially movable with the first roller but disposed not to rotate;

restricting means disposed at a facing surface between the first roller and the second roller to restrict the rotation of the first roller when the first and second rollers are closely adhered; and diving means for slidingly moving the second roller according to selection and non-selection of the change lever to the parking position to couple and detach the first and second rollers.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Embodiments of the present invention will now be described in detail with reference to the accompanying drawings.

Figure 1:
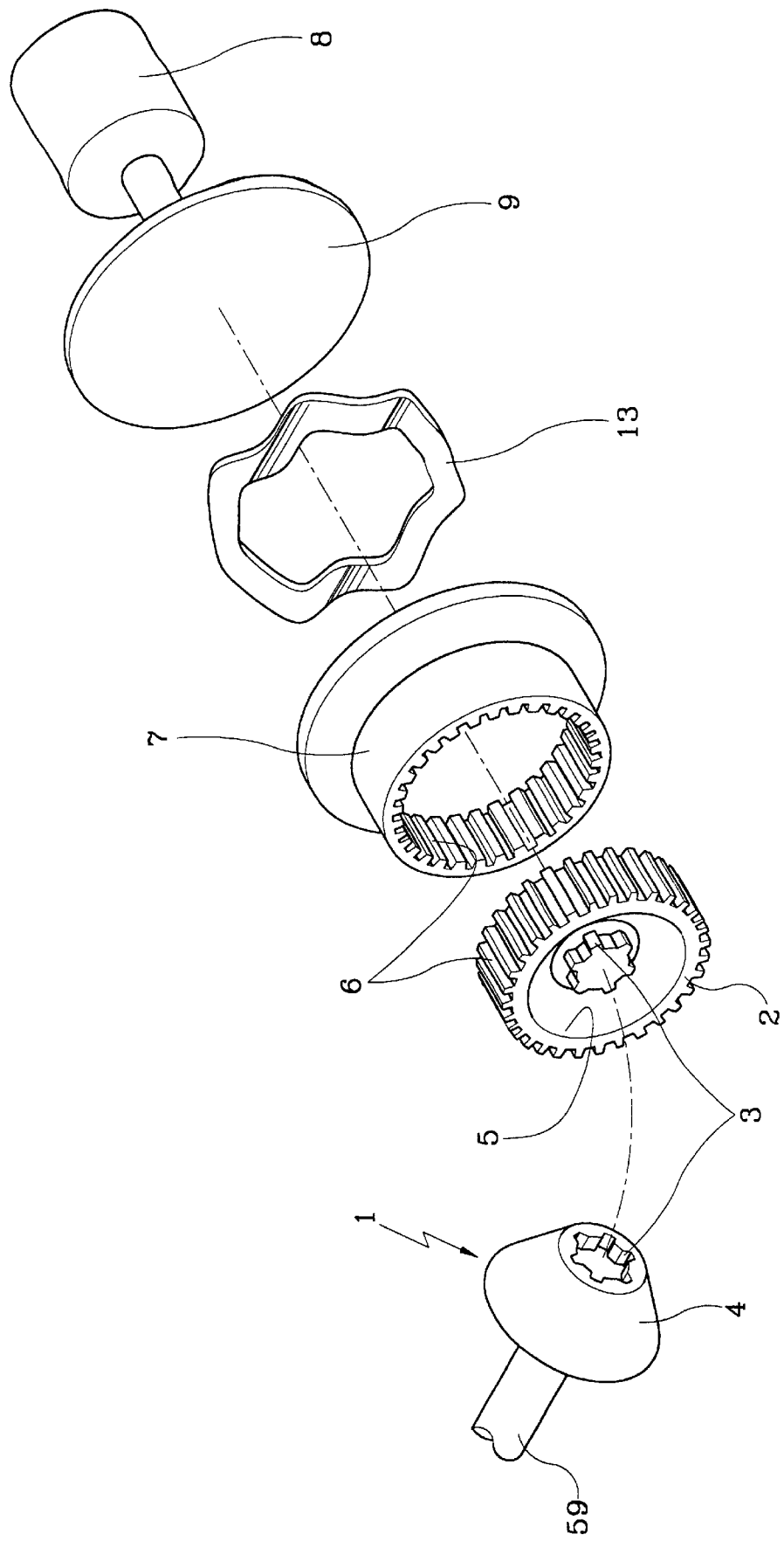
FIG. 1 is a schematic diagram for illustrating a parking brake for automatic transmission mechanism according to the present invention.
Figure 2:
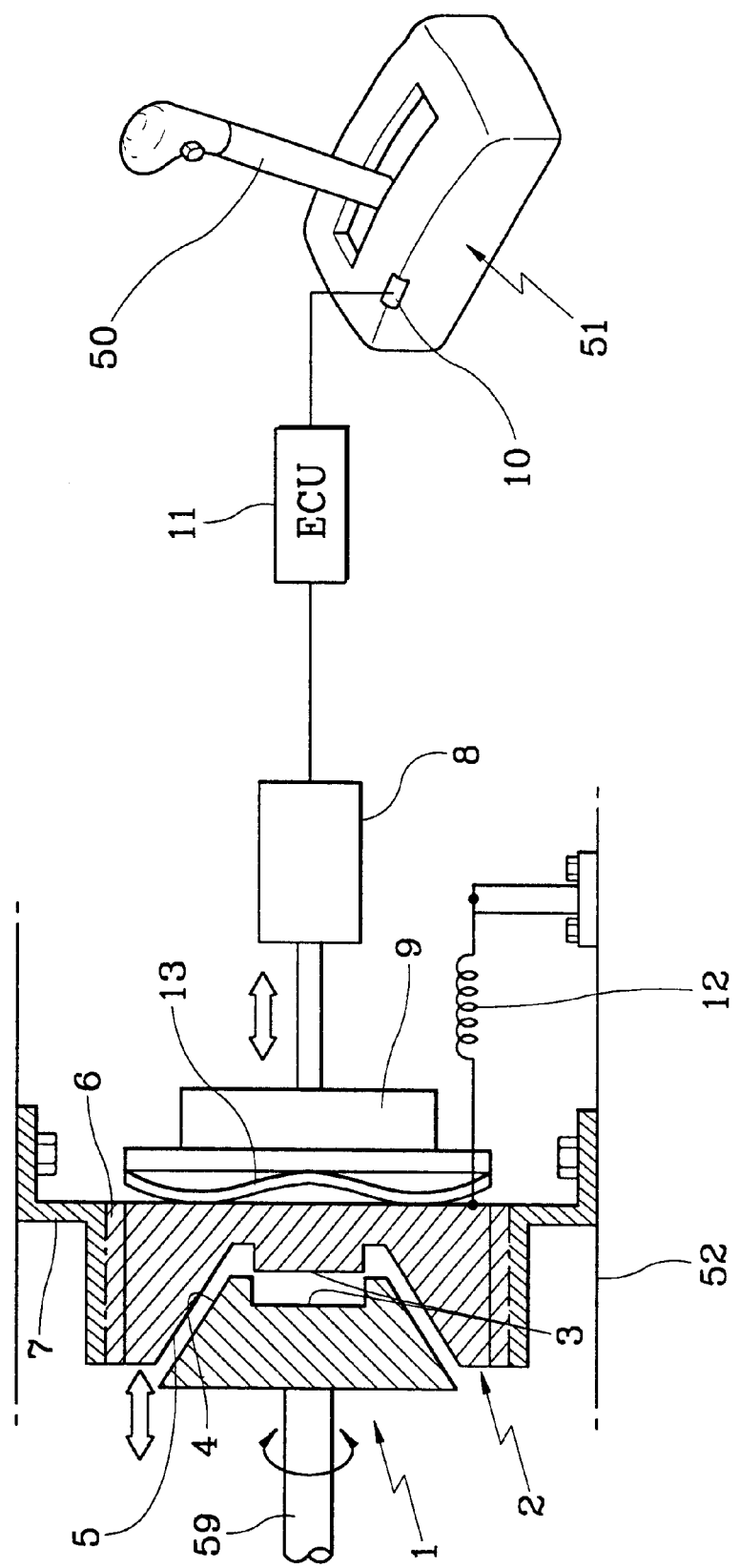
FIG. 2 is a schematic sectional view of principal parts in FIG. 1.

FIGS. 1 and 2 are respectively a schematic diagram for illustrating a parking brake for automatic transmission mechanism according to the present invention and a schematic sectional view of principal parts thereof, where the brake includes:

a first roller 1 fixedly disposed to cooperatively rotate with an output shaft 59;

a second roller 2 so formed as to allow the first roller 1 to be inserted thereinto for being coaxially movable with the first roller 1 but disposed not to rotate;

restricting means disposed at a facing surface between the first roller 1 and the second roller 2 to restrict the rotation of the first roller 1 when the first and second rollers 1 and 2 are closely adhered; and driving means for slidingly moving the second roller according to selection and non-selection of a change lever to the parking position to couple and detach the first and second rollers 1 and 2.

The restricting means defines splines 3 each oppositely formed between the first and the second rollers 1 and 2, thereby restricting the rotation by being mutually inserted therebetween. Of course, the same restricting effect can be obtained if a construction is so made as to employ a spur gear and the like for being meshed to restrict the rotation, without using the splines 3.

Particularly, contact surface between the first and the second rollers 1 and 2 is disposed with synchroneous means for decreasing a rotating speed of the first roller 1 by way of friction before two rollers 1 and 2 are mutually contacted when the first roller 1 rotates with the output shaft 59 at a high speed and for contacting the first and second rollers 1 and 2 after the reduced rotating speed.

The synchroneous means includes a first taper 4 formed at an outer periphery of the first roller 1 and a second taper 5 formed in groove-shape at an inner surface of the second roller 2 for gradually contacting the first taper 4 to get increased friction force and for maximizing the friction force just before coupling of the splines 3 to thereby stop the first roller 1.

The driving means includes a bracket 7 fixed to the transmission mechanism case 52 and coupled to the second roller with splines 6 for enabling the second roller 2 to horizontally slide along for restriction of rotation, a pressure plate 9 disposed at a bottom surface of the second roller 2 for functioning as an actuator 8, and electronic control unit ECU 11 connected to a sensor 10 for actuating the actuator 8 and for sensing a parking range selection of the change lever 50 and a spring 12 so disposed as to pull second roller 2 toward the pressure plate 9.

Between the second roller 2 and the pressure plate 9 there is disposed a wavy disc-shaped spring 13 to cushion an impact generated when the first and the second roller 1 and 2 are closely adhered.

Figure 3:
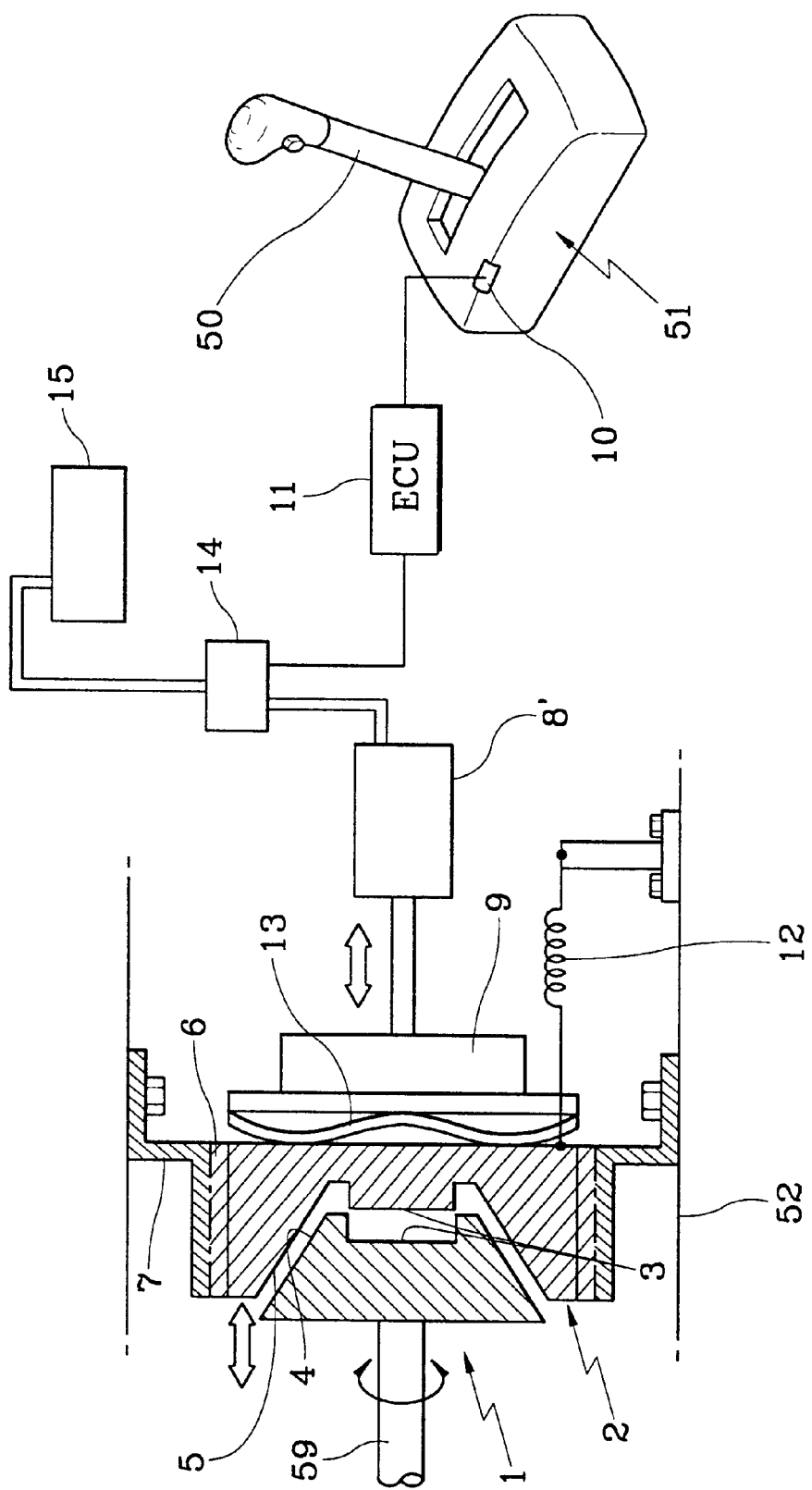
FIG. 3 is a schematic sectional view of driving means according to another embodiment of the present invention.
Figure 4:
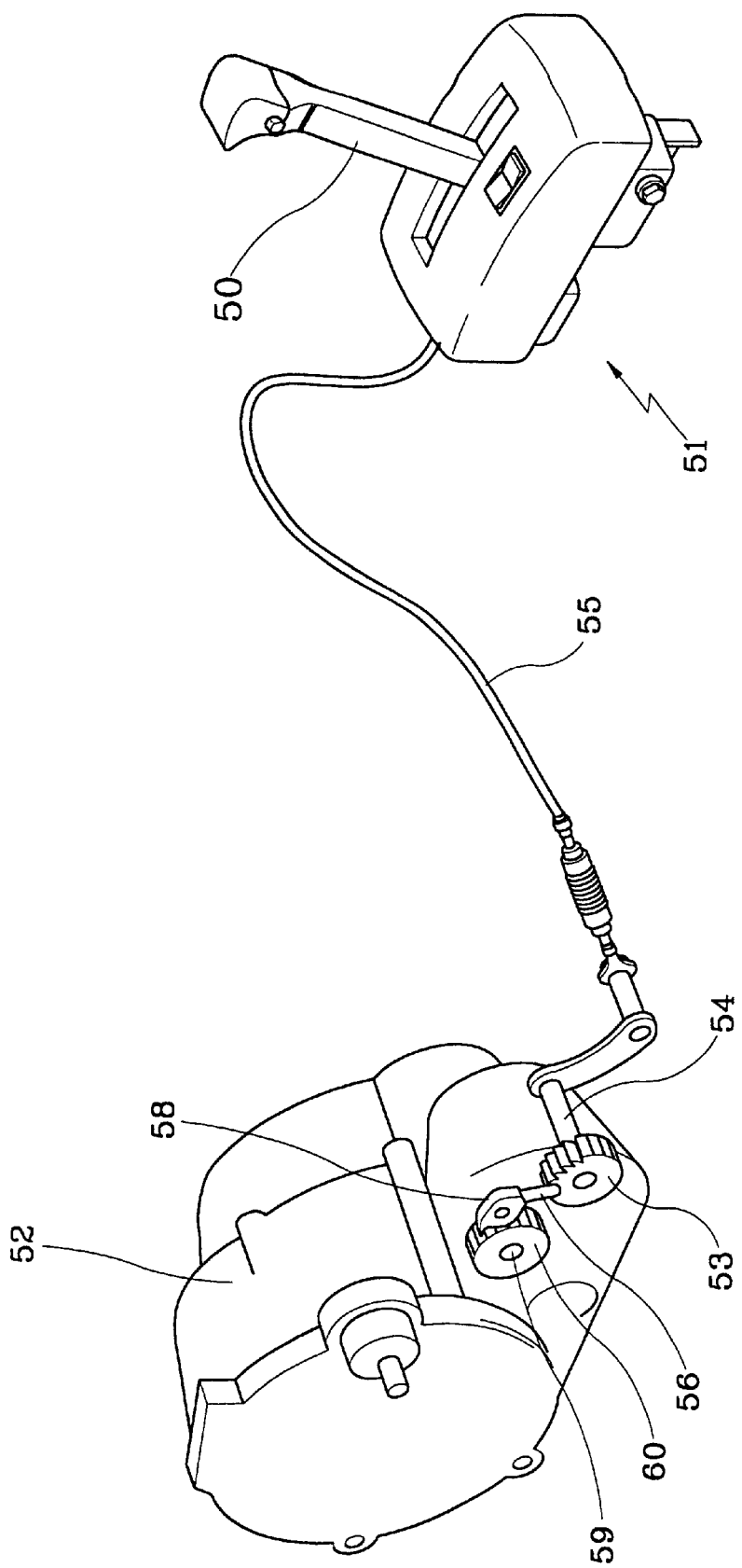
FIG. 4 is a schematic perspective view for illustrating a parking brake for a conventional automatic transmission mechanism.
Figure 5:
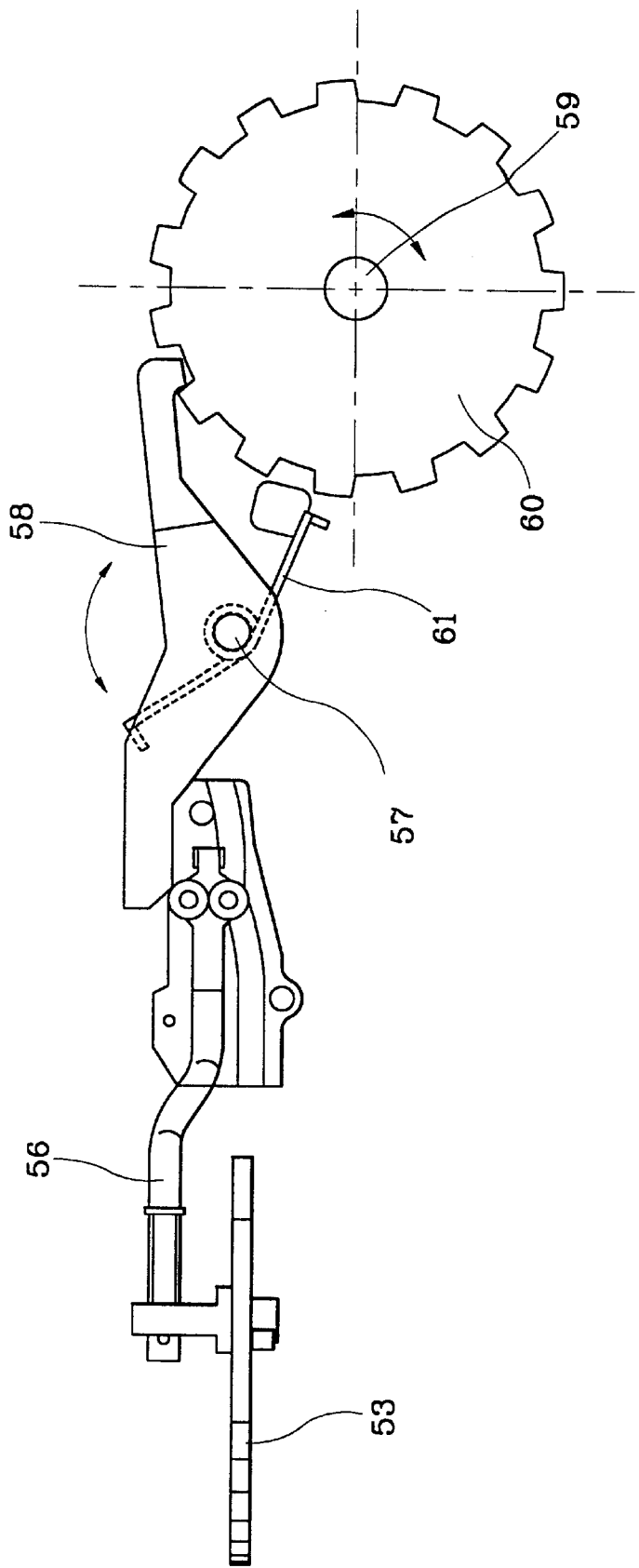
FIG. 5 is an enlarged plan view for illustrating operational state of a parking lever and parking gear shown in FIG. 4.

At this location, another embodiment of the driving means is shown in FIG. 3, where the driving means is disposed with the pressure plate 9 connected by a hydraulic cylinder 8' controlled by the ECU 11, the hydraulic cylinder 8' is mounted with a hydraulic pump 14 for supplying and blocking the hydraulic oil to the hydraulic cylinder 8' and a storage tank 15 for supplying the oil is connected to the hydraulic pump 14.

In other words, construction thereof is so arranged as to make a hydraulic apparatus (hydraulic cylinder, hydraulic pump and the like) having a relatively strong actuating power move the second roller 2, such that adherence of the first and second rollers 1 and 2 is further strengthened to thereby enable a parking state to be maintained even during the occurrence of the sudden start.

Now, operational effect of the present invention will be described. If a driver mistakenly positions the change lever 50 at a parking range while a vehicle is running, the sensor 10 detects that the change lever 50 is selected to be positioned at the parking range and transmits same to the ECU 11.

When a parking signal is transmitted to the ECU 11, the ECU 11 actuates the actuator 8 to move the pressure plate 9 towards the first roller 1, and when the second roller 2 is moved over the splines 6 by the pressure plate 9, the first and second tapers 4 and 5 formed at the contact surface of the first and second rollers 1 and 2 gradually get in touch. When the first and second tapers 4 and 5 gradually become in contact, the first roller 1 is gradually reduced in rotating speed thereof and the contact surface of the first and second rollers 1 and 2 gets increased to virtually stop the speed of the first roller 1.

When the rotating speed of the first roller 1 is almost stopped, the splines 3 oppositely formed relative to the first and second rollers 1 and 2 are coupled to restrict the first roller 1. At this time, the wavy spring 13 provided between the second roller 2 and the pressure plate 9 serves to cushion the amount of impact when the first and the second roller 1 and 2 are contacted therebetween.

In other words, the reversing force of the second roller 2 generated by the impact when the first and second rollers 1 and 2 touch presses the wavy spring 13 which in turn cushions the amount of the impact.

When the splines 3 formed between the first and the second roller 1 and 2 are coupled to thereby restrict the output shaft 59 and to prevent a vehicle from driving, where, because the splines 3 coupling the first and second rollers 1 and 2 are coupled on a parallel line with a rotary centerline of the output shaft 59, the force for restricting the first roller 1 is markedly strengthened as compared with the restricting force coming from the tangential direction in the prior art.

In other words, in the prior art, the rotary direction of the parking gear 60 and that of the parking lever 58 direct the same direction on the same planer, such that the parking lever 58 is easily rotated about the hinge shaft 57 by the turning force of the parking gear 60 to easily release the parking restriction but the present invention restricts the first roller 1 in the parallel direction (normal direction) relative to the rotary direction to thereby increase the braking force remarkably.

Particularly, because the first roller 1 limits the second roller from the normal direction, increased braking force while a vehicle is parked according to coupling of the first and second rollers 1 and 2 and the hydraulic system strongly adhere the first and the second roller 1 and 2 together to thereby prevent the sudden start of the vehicle which occurs due to erroneous operation of the automatic transmission mechanism.

Of course, when the change lever 50 is selected to be positioned at the parking range when a vehicle is being parked and stopped, the synchroneous state is not realized by the first and second taper 4 and 5 and the splines 3 are coupled to thereby park the vehicle.

As apparent from the foregoing, there is an advantage in the parking brake for the automatic transmission mechanism according to the present invention in that a parking brake mechanism is so provided as to restrict a first roller disposed at an output shaft in a vehicle mounted with an automatic transmission mechanism to the normal direction relative to a rotating direction, thereby increasing a parking brake force of the vehicle and preventing a sudden start when the automatic transmission mechanism is erroneously operated.

Furthermore, there is another advantage in that even though the change lever is selected to be positioned in the parking range during the running of a vehicle, the first and second tapers realize a synchronization to adhere the first and second roller, preventing generation of noise and damage of the automatic transmission mechanism.

What is claimed:

1. A parking brake for automatic transmission mechanism, said parking brake adapted to restrict an output shaft according to a change lever provided at the automatic transmission mechanism and selectively positioned in a parking range to thereby generate a braking force while a vehicle is parked, wherein the parking brake comprises:

a first roller fixedly disposed to cooperatively rotate with the output shaft;

a second roller coaxially movable with the first roller but predisposed not to rotate;

restricting means disposed at a facing surface between the first roller and the second roller to restrict the rotation of the first roller when the first and second rollers are in close adherence; and driving means for slidingly moving the second roller according to the selection and non-selection of the change lever to the parking position to couple and detach the first and second rollers.

2. The brake as defined in claim 1, wherein the restricting means is constructed with splines, each oppositely formed between the first roller and the second roller to thereby restrict the rotation.

3. The brake as defined in claim 1 which further comprises synchronous means disposed at a contact surface between the first and the second rollers and so constructed as to gradually decrease the rotating speed of the first roller by way of friction of the first and second rollers when the first roller is rotated in cooperation with the output shaft at a high speed, and to cause the first and second rollers to contact therebetween when the rotating speed is almost stopped.

4. The brake as defined in claim 3, wherein the synchronous means comprises:

a first taper formed at an outer periphery of the first roller; and a second taper formed in a groove-shaped inner surface of the second roller for gradually contacting the first taper to obtain increased friction force and for maximizing the friction force just before coupling of splines to thereby stop the first roller.

5. The brake as defined in claim 1, wherein the driving means comprises:

a bracket fixed to a transmission mechanism case and spline-coupled therein for the second roller to slidably move;

an actuator connected at a bottom surface of the second roller for actuating the second roller;

an electronic control unit connected to control the actuator according to a sensor for detecting a parking range selection of the change lever; and a spring so disposed as to apply a force to a direction for detaching the first roller from the second roller.

6. The brake as defined in claim 5, wherein, between the second roller and a pressure plate there is disposed a wavy disc-shaped spring to cushion an impact generated when the first and the second rollers are closely adhered.

7. The brake as defined in claim 1, wherein the driving means comprises:

a bracket fixed to a transmission mechanism case and spline-coupled therein for the second roller to slidably move;

a hydraulic cylinder connected to a bottom surface of the second roller to move the second roller;

a hydraulic pump connected to a storage tank for supplying fluid to the hydraulic cylinder and connected by an electric control unit for being controlled by a sensor for detecting the parking range selection of the change lever; and a spring so disposed to apply a force toward a direction for detaching the first roller from the second roller.

8. The brake as defined in claim 7, wherein, between the second roller and a pressure plate there is disposed a wavy disc-shaped spring to cushion an impact generated when the first and second rollers are closely adhered.

* * * * *